Nov. 4, 1958  W. J. PACKER  2,858,562
HEAT-INSULATED HANDLE STRUCTURE FOR COFFEE POTS AND THE LIKE
Filed Aug. 4, 1955  2 Sheets-Sheet 1
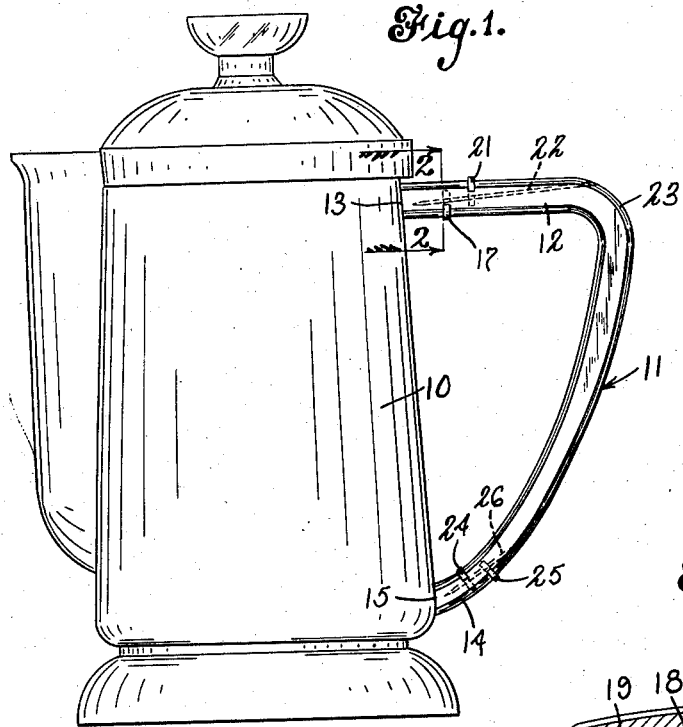
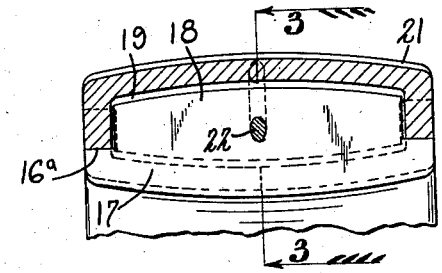
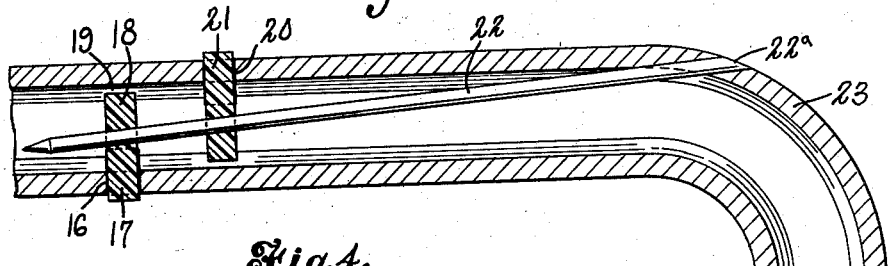
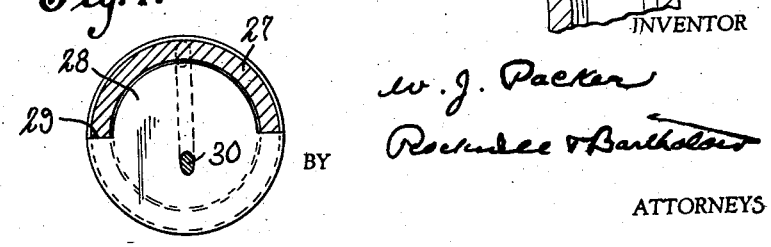
INVENTOR
W. J. Packer
BY Rockwell & Bartholow
ATTORNEYS Nov. 4, 1958 W. J. PACKER 2,858,562
HEAT-INSULATED HANDLE STRUCTURE FOR COFFEE POTS AND THE LIKE
Filed Aug. 4, 1955 2 Sheets-Sheet 2
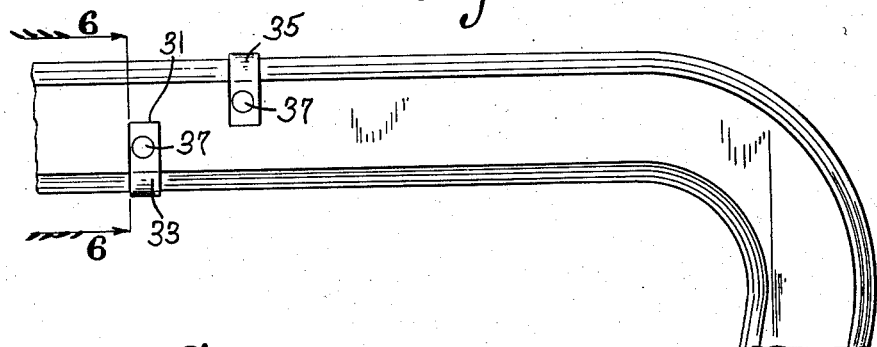
Fig.5.
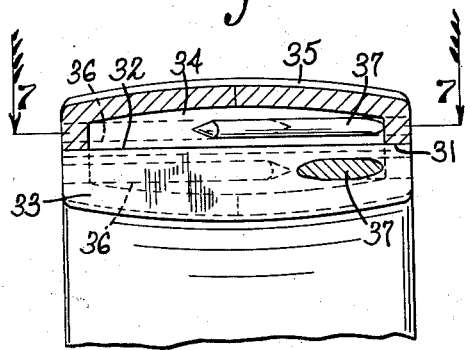
Fig.6.
Fig.7.
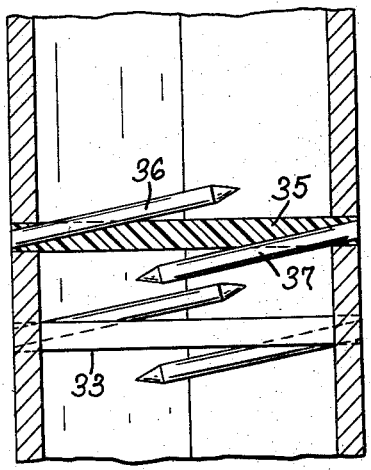
Fig.8.
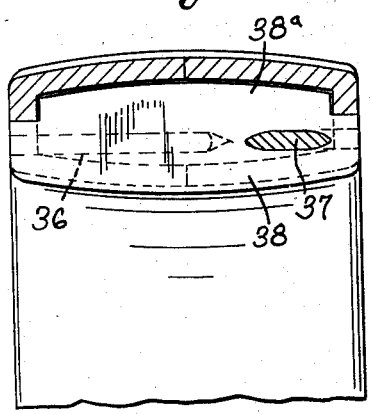
INVENTOR
W. J. Packer
BY Rockwell & Bartholow
ATTORNEYS

United States Patent Office 2,858,562
Patented Nov. 4, 1958

2,858,562

HEAT-INSULATED HANDLE STRUCTURE FOR COFFEE POTS AND THE LIKE

Warren J. Packer, Meriden, Conn.

Application August 4, 1955, Serial No. 526,409

1 Claim. (Cl. 16—119)

This invention relates to a heat-insulated handle structure for coffee pots and the like.

A considerable number of heat-insulated handle structures for use on coffee pots, water vessels and other receptacles have been devised in the past with the object of enabling the receptacle to be picked up and handled when containing very hot liquid without causing burning or great discomfort. However, so far as I am advised, all of the previous handle structures proposed for use have had serious drawbacks and defects.

An object of the present invention is to provide a handle structure in which the metal of the handle may extend continuously from an upper joint with the receptacle body to a lower joint with the body, the construction being such that, notwithstanding this fact, effective insulation for the purposes in view is provided in a manner such that the article is simple and practical and commercially acceptable.

Another object is to provide a handle-equipped receptacle, such, for example, as a silver-plated coffee pot, in which the means employed for inhibiting uncomfortable heating of that part of the handle grasped by the hand is very effective and serves satisfactorily through a long life without the need of attention, and can be readily employed by the manufacturer of the article in the production of the article for the market.

To these and other ends the invention consists in the novel features to be hereinafter described and pointed out in the claim.

In the accompanying drawings:

Fig. 1 is a side elevation of a coffee pot constructed in accordance with the invention;

Fig. 2 is an enlarged section on line 2—2 of Fig. 1;

Fig. 3 is an enlarged longitudinal section through the upper part of the handle, taken on line 3—3 of Fig. 2;

Fig. 4 is a cross section of a modified structure in which the handle is of round rather than flattened cross section;

Fig. 5 is a fragmentary side elevation showing the upper part of a modified handle;

Fig. 6 is a section on line 6—6 of Fig. 5;

Fig. 7 is a section on line 7—7 of Fig. 6; and

Fig. 8 is a cross section showing a further modification.

In the forms of my invention herein shown, the receptacle has a hollow handle of suitable cross section made of metal, one end of the hollow metal member being attached as by brazing to the upper part of the receptacle body, and the other end being attached in a similar manner to the lower part of the body.

In Fig. 1, the body of the pot is indicated at 10, and the handle at 11, said handle having a substantially horizontal upper portion 12 attached to the body at 13, and a lower part 14 arranged on a curve and having a straight lower part 15 facing and brazed or similarly attached to the body end 10. The handle may be made of two sections of channel shape suitably interconnected to provide a hollow one-piece structure of the cross section shown in Fig. 2, the connection of the two parts being indicated by lines in Fig. 2. The flattened cross section shown in Fig. 2 is by way of example, and the particular make-up of the hollow member is also by way of example.

The insulation of this handle is provided by cutting away the handle near each extremity to provide insulating means held in place in the cut-away part, and in this form, as shown in the drawings, two flat pieces of suitable insulating material are set in parallel-walled cut-outs or kerfs at each end of the handle, these kerfs being offset from each other longitudinally of the handle and entering the handle from opposite sides, so that the effect of the kerfing will not reduce the strength of the handle beyond a certain safety point. The pieces of insulating material, such as vulcanized fiber, casein or the like, are of planar form, and they are or may be held in place in their kerfs by pinning them to the handle, as hereinafter described. The arrangement used at the two end portions of the handle is substantially the same, and the structure for the upper end portion of the handle, shown in detail in Figs. 2 and 3, may be taken as exemplary.

Referring to Fig. 3, a lower kerf 16 is cut in the lower part of the handle so as to extend in a transverse direction, said kerf extending through the lower wall of the handle and into the side walls up to a point such as indicated at 16ª. The piece 17 of insulating material is of the shape shown in Fig. 2, so that its lower edge is substantially flush or projects very slightly from the lower handle surface, a part or extension 18 of this piece being shaped to conform generally to the interior shape of the handle, leaving, however, a space 19 between the upper edge of the piece and the upper enclosing wall. A second kerf 20, similar to the first, enters the upper wall of the handle in a location offset lengthwise from the first kerf, and in this second kerf is placed a second insulating piece 21 similar to the piece 17.

In this particular case a common pin means is provided for holding both of the insulating pieces in place. In this particular case the lower insulating piece is arranged closer to the receptacle body than is the upper piece, and a pin 22, driven into the handle at the upper part of the elbow 23 in the handle and driven through respective holes in the insulating pieces, serves to hold the pieces in place very effectively. It is noted from Fig. 3 that the pin 22 is at a slight angle to the upper part 12 of the handle, and that the extreme end portion 22ª of pin 22 is extended substantially beyond the insulating piece 17. The pin is driven from the elbow portion in the direction of the joint between the body of the receptacle and the upper end of the handle, and the sharpened end of the pin lies somewhat above the lower wall of the handle, the only visible part of the pin being the beveled extremity at the elbow portion which is flush with the surface of the elbow.

It is believed that it will be unnecessary to describe the insulating means provided at the lower end of the handle, which is substantially the same as that described above. This means includes an inner insulating piece 24, an outer insulating piece 25, and a pin member 26 similar to member 22.

The structure as above described for insulating the handle may be employed in a similar manner in connection with a handle 27 of round cross section, as shown in Fig. 4. This round or tubular handle may have one or more insulating pieces 28 set in a kerf 29 and held in place by a pin member 30 similar to that above described.

Referring to Fig. 3, for example, it will be evident that heat flowing from the pot into the lower wall portion of the handle will be blocked off by insulating member 17 and heat flowing into the upper wall portion will be blocked off at a slightly greater distance from the pot by the member 21. The result is that in the handle portion between members 17 and 21 such heat flow as occurs is confined to a narrow path in the metal at each side of the handle. This is sufficient to prevent uncomfortable heating of the gripping part of the handle without prejudicial reduction of the handle strength.

Figs. 5, 6 and 7 show another handle structure in which the hollow handle is equipped with insulating pieces arranged transversely of the handle and offset from each other. In this case, however, the insulating pieces are of somewhat different outline, and are held in place by pin means of a somewhat different character. Here the kerf is extended into the side wall of the handle to a greater extent than in the first form, the kerf terminating substantially at a midpoint 31 in the wall, as appears from Fig. 6. The inner side edge or boundary 32 of the insulating piece 33 is a straight edge extending from end to end of the piece and engaging the kerf bottom, the arrangement being such that a substantial air space 34 is provided between the inner edge of the piece and the opposing wall. In this case the insulating pieces 33 and 35 are each held in place by pin means including two pins 36 and 37 inserted into the piece and into the handle in the manner shown in Fig. 7. The pin 36, for example, is driven into the insulating piece at one end of the piece on an inclination such that the pin deviates from the piece laterally at a slight angle, the arrangement being such that the pointed end of the pin protrudes from the piece within the handle, as shown in Fig. 7. From the opposite end of the piece, the other pin 37 is driven in, as shown in Fig. 7, so that its inclination will make it substantially parallel to pin 36. By such an arrangement the piece is held in position very securely, so that through a long life it will not be displaced relatively to its holding recess. In effect, the arrangement is such that the pin holds the piece in place, and the piece holds the pin in place in a manner to resist displacement of the parts in any manner. The pin has, in this example, a smooth end face flush with the end face of the insulating piece and, as in the first described form, it is so small that it does not in any way detract from the appearance of the article. In the drawings, the structure is considerably enlarged, and it is to be understood that the insulating pieces in practice are so thin (having a thickness of, say, 1/16 inch, for example) that they do not in any way detract from the appearance of the article, their edges being approximately flush with the handle surface.

In the modification shown in Fig. 8, the structure is in general quite similar to that of Fig. 6, but in this case the piece 38 of insulating material, instead of having a straight inner edge throughout its length, has an extension 38a which substantially conforms to the opposing wall of the handle in that part of the hollow handle which is between the two side walls.

The described construction has the advantage that it enables the handle to be of continuous metal from end to end, with the ends directly applicable to the receptacle body by brazing or the like, the insulating members, however, being sufficiently effective to block off the transmission of heat to the grasping portion of the handle to a degree such that the grasping portion is capable of burning or acute discomfort as the receptacle, with heated contents, is handled. It will be apparent that, with the described construction, heat passing from the body along one side or lateral portion of the handle is blocked by one of the insulation bodies or fillers, and heat at the opposite side will have a longer or shorter travel before reaching a second insulation member, and this enables a sufficiently strong, continuous metal structure to be used in the region where the fillers are employed, and, nevertheless, the combined effect of the described handle structure is to reduce very markedly the heat of the grasping portion of the handle. In some cases, however, the employment of one such filled kerf adjacent a handle terminal in the manner herein described will be of advantage. The construction is a simple one, enabling the insulation to be applied to the handle very conveniently, and the structure is relatively inexpensive.

In the forms shown by way of example in the drawings, the kerf extends throughout the handle width, or, in other words, for a length substantially corresponding to the handle width or lateral dimension, and it is to be noted that the length of the kerf takes up a relatively large part of the cross section of the handle wall, the result being that where two spaced apart filled kerfs are employed at a handle end, as herein described, heat flowing lengthwise of the handle is confined to a narrow path or by-pass at each side of the handle. Thus the provision of the long kerf reduces very markedly the cross section of metal through which heat can pass to the grasping portion of the handle. In addition, the filler placed in and extending throughout the length of the kerf is of a nature to inhibit heating of the grasping portion. The filler also has the further important function of closing off and sealing the space within the handle so as to preclude the entry of foreign matter into the handle either in the course of manufacturing the product or in the course of cleansing the same after use. Under such conditions the entry of foreign matter into the handle is objectionable. It would be particularly difficult to eliminate injurious material in a liquid state if it had access to the handle interior.

Various changes can be made in the details without departing from the principles of the invention and the scope of the claim.

What I claim is:

For use with a receptacle having a potlike metal body with a side wall, a hollow metal handle having an intermediate grasping portion and provided at opposite ends with integral hollow attaching portions extending from said grasping portion and adapted to be secured to said side wall, said handle throughout the aforesaid portions having relatively wide upper and lower walls and relatively short side walls, each of said attaching portions having kerfs located adjacent each other but at different distances from the corresponding extremity of the handle, said kerfs extending continuously throughout the width of the handle in a transverse direction, one of the kerfs of each attaching portion being in the upper wall of the handle and the other being in the lower wall, said kerfs of each attaching portion being open throughout their length to the external and internal surfaces of the handle, said kerfs blocking heat transfer in the metal of the handle wall from the attaching portions toward said grasping portion except for limited portions of the side walls of the handle, and fillers of thermal insulating material in said kerfs serving to seal off the handle interior.

References Cited in the file of this patent

UNITED STATES PATENTS

| | | |
|---|---|---|
| 211,692 | Bingham | Jan. 28, 1879 |
| 740,649 | Heer | Oct. 6, 1903 |
| 841,138 | Gault | Jan. 15, 1907 |
| 1,528,730 | Woodbine | Mar. 3, 1925 |
| 1,637,853 | Brown | Aug. 2, 1927 |
| 1,799,782 | Church | Apr. 7, 1931 |
| 1,907,991 | Martha | May 9, 1933 |

FOREIGN PATENTS

| | | |
|---|---|---|
| 173,670 | Switzerland | Dec. 15, 1934 |
| 510,471 | France | Dec. 6, 1920 |
| 785,892 | France | Aug. 21, 1935 |